US005391043A

United States Patent [19]

Bohata et al.

[11] Patent Number: 5,391,043

[45] Date of Patent: Feb. 21, 1995

[54] TRUCK MOUNTED LIFTING MECHANISM FOR LIFTING AND TRANSPORTING CONTAINERS

[76] Inventors: John F. Bohata, 45 Norwick La., Smithtown, N.Y. 11787; Anthony Leteri, 18 Allenby Dr., Northport, N.Y. 11768

[21] Appl. No.: 140,524

[22] Filed: Oct. 25, 1993

[51] Int. Cl.[6] ..... B65G 67/02

[52] U.S. Cl. ..... 414/544; 414/422; 414/629; 414/636

[58] Field of Search ..... 414/540-542, 414/544, 420, 422, 672, 628-638, 664, 668

[56] References Cited

U.S. PATENT DOCUMENTS

| | | | |
|---|---|---|---|
| 2,092,663 | 9/1937 | Bach | 414/630 |
| 2,126,289 | 8/1938 | Schroeder | 414/631 X |
| 2,437,806 | 3/1948 | Dempster | 414/544 |
| 2,542,425 | 2/1951 | Oliver | 414/544 X |
| 2,599,524 | 6/1952 | Lehmann | 414/628 X |
| 2,603,368 | 7/1952 | Vance | 414/636 X |
| 4,219,298 | 8/1980 | Stragier et al. | 414/544 X |
| 4,690,610 | 9/1987 | Fotheringham | 414/631 |
| 4,778,327 | 10/1988 | Tufenkian et al. | 414/541 |
| 4,943,203 | 7/1990 | Bohata | 414/541 X |
| 5,082,090 | 1/1992 | Walker | 414/631 X |

*Primary Examiner*—David A. Bucci

*Attorney, Agent, or Firm*—Galgano & Burke

[57] ABSTRACT

The truck mounted lifting mechanism is carried on a truck frame having a pair of opposed C-shaped tracks extending rearward from the cab. A mast having a base carrying an axle engages the outside of the tracks with a pair of flanged rollers. A carriage is mounted at one end on the base axle of the mast. The other end of the carriage is provided with an axle and a pair of flanged rollers which engage the inside of the tracks. The carriage is provided with a threaded central opening and a screw gear extends through the threaded opening and along substantially the entire length of the truck frame. The screw gear is coupled by a chain drive to an hydraulic drive motor. Operation of the drive motor rotates the screw gear causing a lateral displacement of the carriage and the mast between the cab and the rear end of the truck frame. The rear end of the truck frame is provided with a pair of telescoping jacks to stabilize the truck during lifting. The mast is provided with a vertically movable and rotatable fork. Vertical movement of the fork is enhanced so that it may be lowered substantially below the truck frame. An hydraulic cylinder between the mast and the carriage allows the mast to be tilted either forward or backward. Mechanical stops at the base of the mast to prevent the mast from tilting too far forward into the cab. The cab is protected from the mast by a K-frame.

18 Claims, 7 Drawing Sheets

TRUCK MOUNTED LIFTING MECHANISM FOR LIFTING AND TRANSPORTING CONTAINERS

BACKGROUND OF THE INVENTION

1. Field of the Invention

The invention relates to a truck mounted lift mechanism for loading and unloading containers. More particularly, the invention relates to a vertically movable lift mounted on a horizontally movable carriage carried by a truck for lifting and transporting containers.

2. State of the Art

The state of the art is well represented by U.S. Pat. No. 4,778,327 to Tufenkian et al. and by U.S. Pat. No. 4,943,203 to Bohata.

Tufenkian et al. disclose a bin lifting mechanism which is mounted on a flat bed truck for transporting waste product containers. The lifting mechanism includes a track extending along the length of the truck bed, a tray which can be moved along the length of the track and a jack-up assembly (fork lift) attached to and supported by the tray. A pair of hydraulic cylinders attached between the tray and the jack-up assembly permit forward tilting of the jack-up assembly toward the truck cab. In use, the tray carrying the jack-up assembly is moved to the rear of the truck. The fork is lowered below the truck bed and the truck is backed towards a container until the fork engages sleeves in the container. The fork is then raised, lifting the container above the truck bed. The tray is moved by hydraulic ram towards the truck cab and the jack-up assembly is tilted toward the cab. Tufenkian et al. thereby locate the container in a balanced location in the center of the truck bed so that the container can be safely transported.

Bohata discloses a similar arrangement but with the added ability to tilt the truck bed so that the fork can be brought closer to the ground. Bohata also teaches the use of rollers between the track and the tray whereas Tufenkian et al. only show the tray sliding on the track with skids.

Both of these arrangements are limited to handling loads of about 2,500 lbs. This is partly because neither provides any rear stabilization on the truck bed to prevent the rear wheels of the truck from acting as a fulcrum while the container is being lifted off the ground. Other load limiting factors include the absence of rollers or the type of rollers used between the tray and the track.

The prior art is also limited in the amount of horizontal movement available to the tray. In the prior art, hydraulic cylinders or a winch and cable are used to move the tray and these occupy space which cannot be traversed by the tray. Neither prior art arrangement is capable of reaching very far below the truck bed to lift a container out of a hole or located on a slope. Articulation of the fork of the prior art arrangements is limited to vertical movement and some forward or rearward tilting.

INCORPORATION BY REFERENCE

The complete disclosures of the above-mentioned U.S. Pat. Nos. 4,778,327 and 4,943,203 are hereby incorporated herein by reference.

SUMMARY OF THE INVENTION

It is therefore an object of the invention to provide a truck mounted lifting mechanism which has a greater lifting capacity than the prior art mechanisms.

It is also an object of the invention to provide a truck mounted lifting mechanism which has a greater horizontal and vertical mobility.

It is another object of the invention to provide a truck mounted lifting mechanism which has a greater degree of articulation so that a container may be lifted and inverted for dumping the contents of the container.

It is still another object of the invention to provide a truck mounted lifting mechanism which has a low center of gravity and is stabilized to prevent tilting the truck during the handling of heavy loads.

In accord with these objects which will be discussed in detail below, the truck mounted lifting mechanism of the present invention includes a truck with a box frame behind a cab. The truck frame is provided with a pair of opposed C-shaped tracks extending rearward from the cab. A mast having a base carrying an axle engages the outside of the tracks with a pair of flanged rollers. A carriage is mounted at one end on the base axle of the mast. The other end of the carriage is provided with an axle and a pair of flanged rollers which engage the inside of the tracks. The carriage is provided with a threaded central opening (preferably a ball nut) and a screw gear extends through the threaded opening and along substantially the entire length of the truck frame. The screw gear is coupled by a chain drive to an hydraulic drive motor. Operation of the drive motor rotates the screw gear causing a lateral displacement of the carriage and the mast between the cab and the rear end of the truck frame. The rear end of the truck frame is provided with a pair of telescoping jacks to stabilize the truck and prevent the rear wheels of the truck from acting as a fulcrum. The mast is provided with a fork which is vertically movable and rotatable. The vertical movement of the fork is enhanced so that the fork may be lowered substantially below the truck frame.

Preferred aspects of the invention include providing an hydraulic cylinder between the mast and the carriage so that the mast may be tilted either forward or backward; providing mechanical stops at the base of the mast to prevent the mast from tilting too far forward into the cab; protecting the cab from the mast with a K-frame; and providing the fork edges with adaptability to lift almost any kind of container.

Additional objects and advantages of the invention will become apparent to those skilled in the art upon reference to the detailed description taken in conjunction with the provided figures.

BRIEF DESCRIPTION OF THE DRAWINGS

Other objects and features of the present invention will become apparent from the following detailed description considered in connection with the accompanying drawings which disclose two embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF THE PREFERRED EMBODIMENTS

Figure 1:
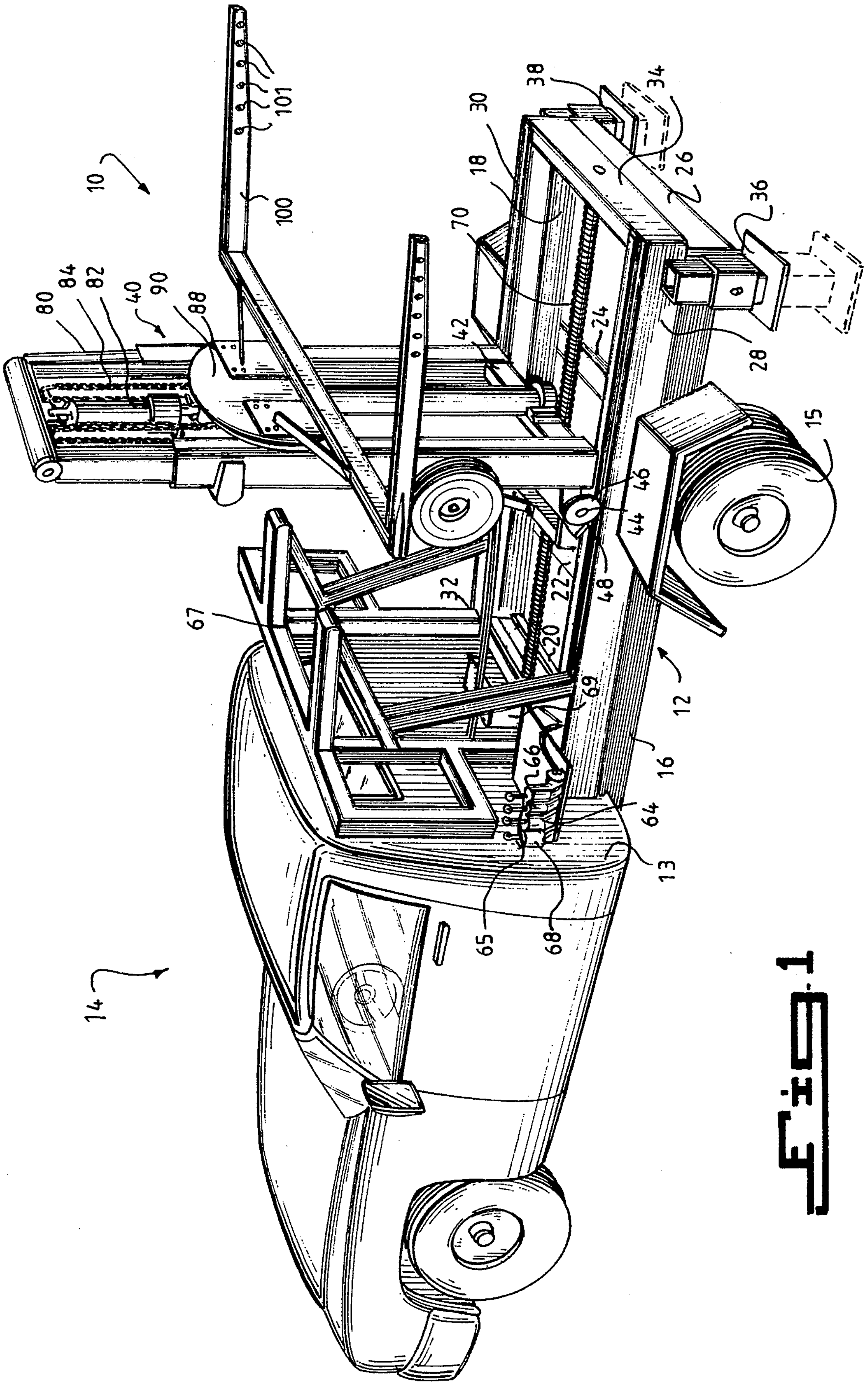
FIG. 1 is a perspective view of the lifting mechanism of the invention in an intermediate position on the frame of a truck.

Referring now to FIGS. 1 through 4, the lifting mechanism 10 of the invention is mounted on the rear frame 12 of a truck 14. The frame 12 is constructed of a pair of longitudinal members 16, 18 extending rearward from the truck cab 13 and joined by cross members 20, 22, 24, 26. A pair of C-shaped tracks 28, 30 are mounted on top of longitudinal members 16, 18 and reinforced by cross members 32, 34. A pair of stabilizing jacks 36, 38 are mounted to the rear end of the frame 12 adjacent cross member 26. These jacks may be raised (as shown) or lowered (as shown by dotted lines) to stabilize the truck and prevent the rear wheels 15 from acting as a fulcrum as will be described below.

Figure 4:
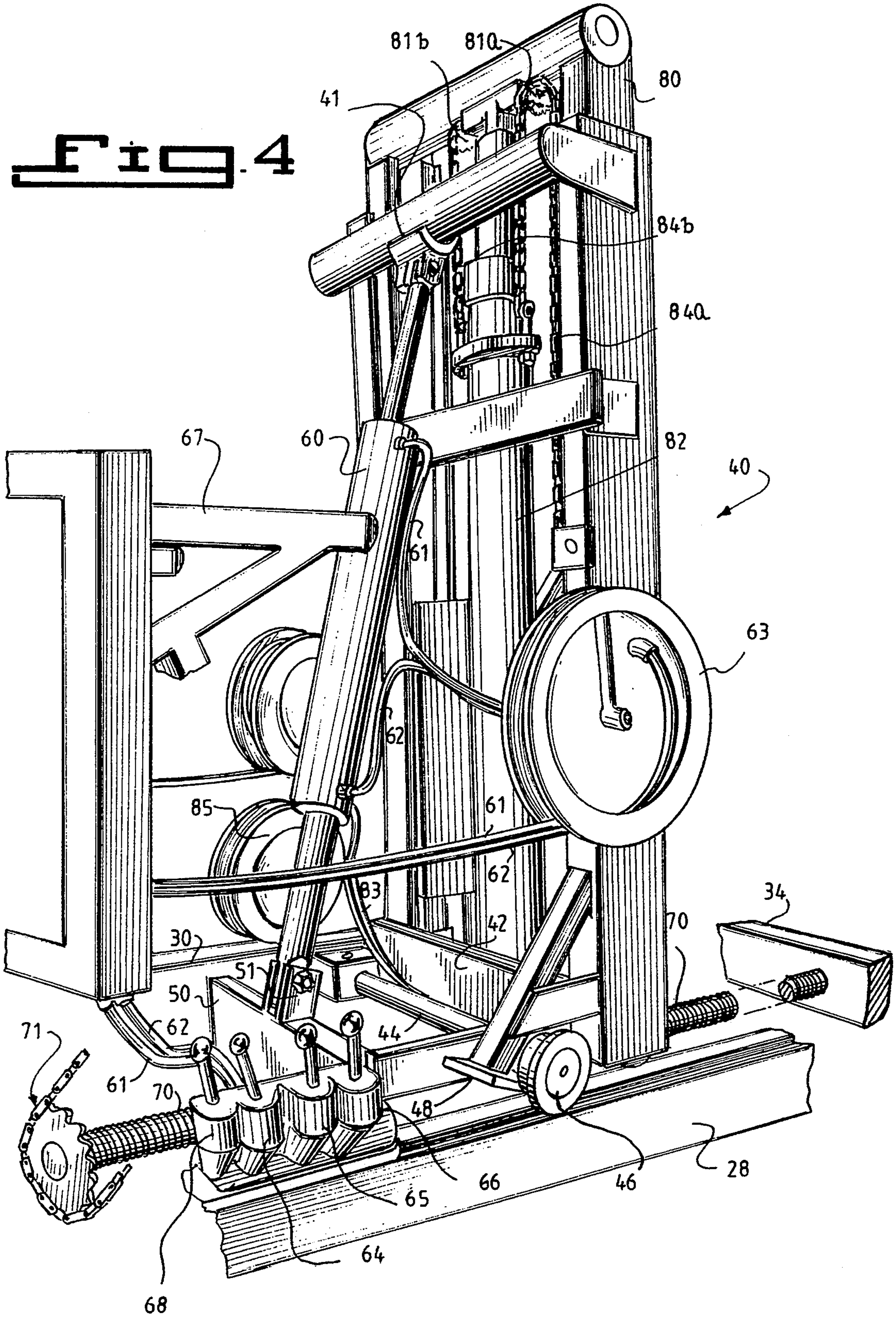
FIG. 4 is a broken perspective view of the mast, carriage, K-frame, and chain drive of the screw.

As seen best in FIGS. 4, **4*a*, and 4*b*, the lifting mechanism 10 generally comprises a mast 40 having a base 42 carrying an axle 44. A pair of outer flanged rollers 46, 47 are mounted on the axle 44. Rollers 46, 47 roll on the top of tracks 28, 30 with their flanges outside the tracks. Mast 40 is tiltable about axis 44. In order to stabilize the vertical position of the mast 40, a carriage 50 is coupled to axle 44. Carriage 50 is provided with half axles 52, 53 which carry inner flanged rollers 54, 55 (similar to rollers 46, 47). Rollers 54, 55 roll on the underside of tracks 28, 30 with their flanges inside the tracks. An hydraulic cylinder 60 is pivotally coupled to an upper cross member 41 of mast 40 and is pivotally coupled at 51 to the carriage 50. Hydraulic cylinder 60 is fed by flexible conduits 61, 62 which preferably are carried by a self-winding pulley 63 mounted on a side of the mast 40. These conduits extend from the cylinder 60 through the pulley 63 forward to the rear of cab 13 where they are switchably coupled to a source of hydraulic pressure (not shown) by a lever valve 64. Those skilled in the art will appreciate that operation of the valve 64 will cause cylinder 60 to expand or contract thereby tilting the mast 40 on axle 44 either forward or backward. In order that the mast not be tilted too far backward, mechanical stops 48, 49 are provided at a lower portion of mast 40**.

Figure 3:
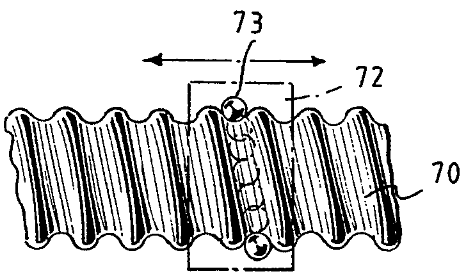
FIG. 3 is a cross sectional view of the ball and screw drive for displacing the carriage.

The carriage 50 and mast 40 are movable along the tracks 28, 30 by means of a screw gear 70 which engages a threaded member 72 in the carriage 50. The screw gear 70 is mounted for rotation at the front and rear cross members 32, 34. The front end of screw gear 70 is provided with a chain drive 71 coupling it to an hydraulic motor 69 (see FIG. 1) controllable by a lever valve 65 near the rear of the cab 13. Those skilled in the art will appreciate that activation of the hydraulic motor through valve 65 causes screw gear 70 to rotate and drives the carriage 50 and mast 40 along the tracks 28, 30 either forward or backward depending on the direction of rotation of screw gear 70. In order to provide the smoothest transmission of energy from the screw gear 70 to the carriage 50, the threaded member 72 is preferably formed from a plurality of ball bearings 73 (a ball nut) as shown in FIG. 3. In order to prevent the mast 40 from accidental collision with the cab 13, a K-frame 67 is mounted on the truck frame 12 in back of the cab 13.

Figure 4A:
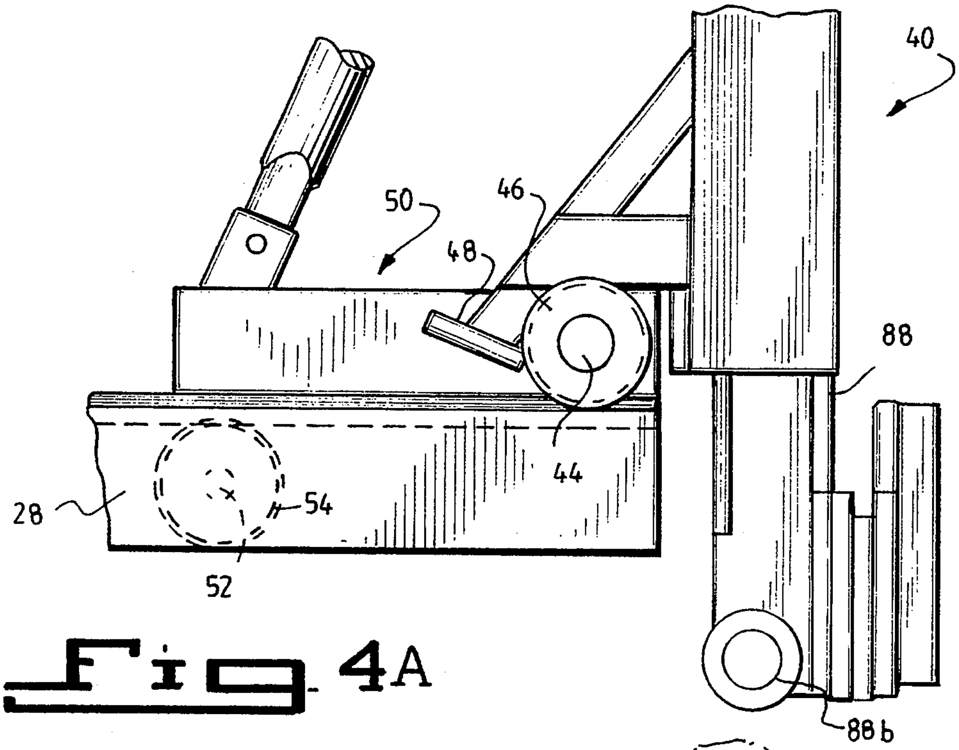
FIG. 4*a* is a broken side elevation view of the mast and carriage at a rear position on the tracks.
Figure 4B:
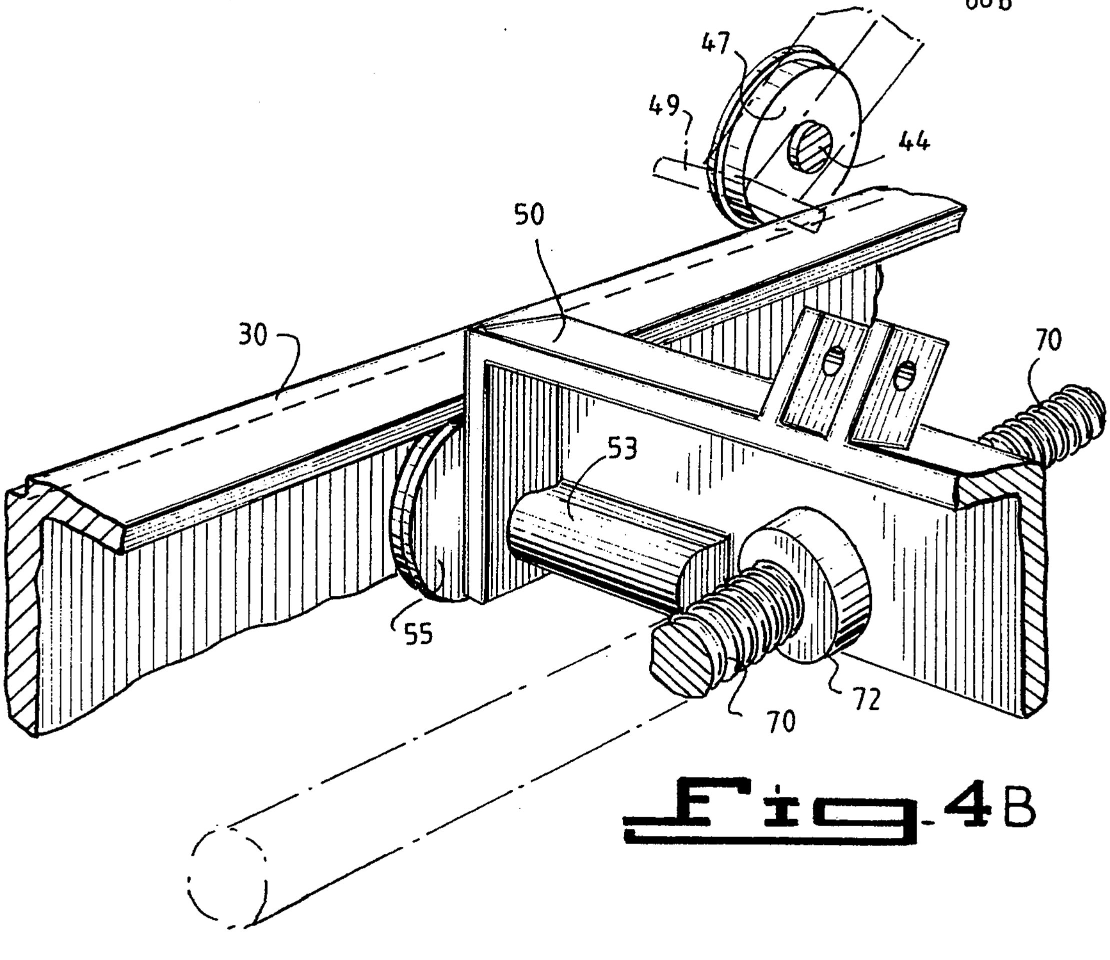
FIG. 4*b* is a broken perspective view of a portion of the carriage and mast showing relative location of the rollers and the screw.

As seen best in FIGS. 1, 4, **4*a*, 5, and 7, the mast 40 houses an upper vertically movable inner portion 80 which telescopes within the mast 40 on rollers (e.g. 80*a* in FIG. 5) by action of an hydraulic cylinder 82. A pair of pulleys 81*a*, 81*b* are mounted at the top of the upper vertically movable inner portion 80. Chains 84*a*, 84*b* are coupled at one end respectively to a stationary part such as the cylinder 82 and are carried over pulleys 81*a*, 81*b* to a lower vertically movable fork support 88 which also rides inside mast 40 on rollers (e.g., 88*a*, 88*b* in FIGS. 4*a* and 6). Cylinder 82 is fed by flexible conduit 83 which is carried on a self-winding pulley 85 mounted on mast 40 to the rear of the cab 13 and connected through a lever valve 66 to a source of hydraulic fluid (not shown). Those skilled in the art will appreciate that operation of the valve 66 will move the inner portion 80 of the mast 40 up or down and that doing so will move the chains up or down resulting in up or down movement of the fork support. Fork support 88 carries an hydraulically operated rotator 90 such as the "R6000" available from Container Bins, Inc. of Clackamas, Oreg. A lifting fork 100 is securely mounted on the rotator 90. Rotator 90 is fed by flexible conduits 92 which are carried on a self winding pulley 94 to the rear of cab 13 where they are coupled to a source of hydraulic fluid (not shown) through a lever valve 68. The rotator 90 is capable of rotating the lifting fork 360° in either direction as shown for example in FIGS. 5 and 7**.

Figure 2:
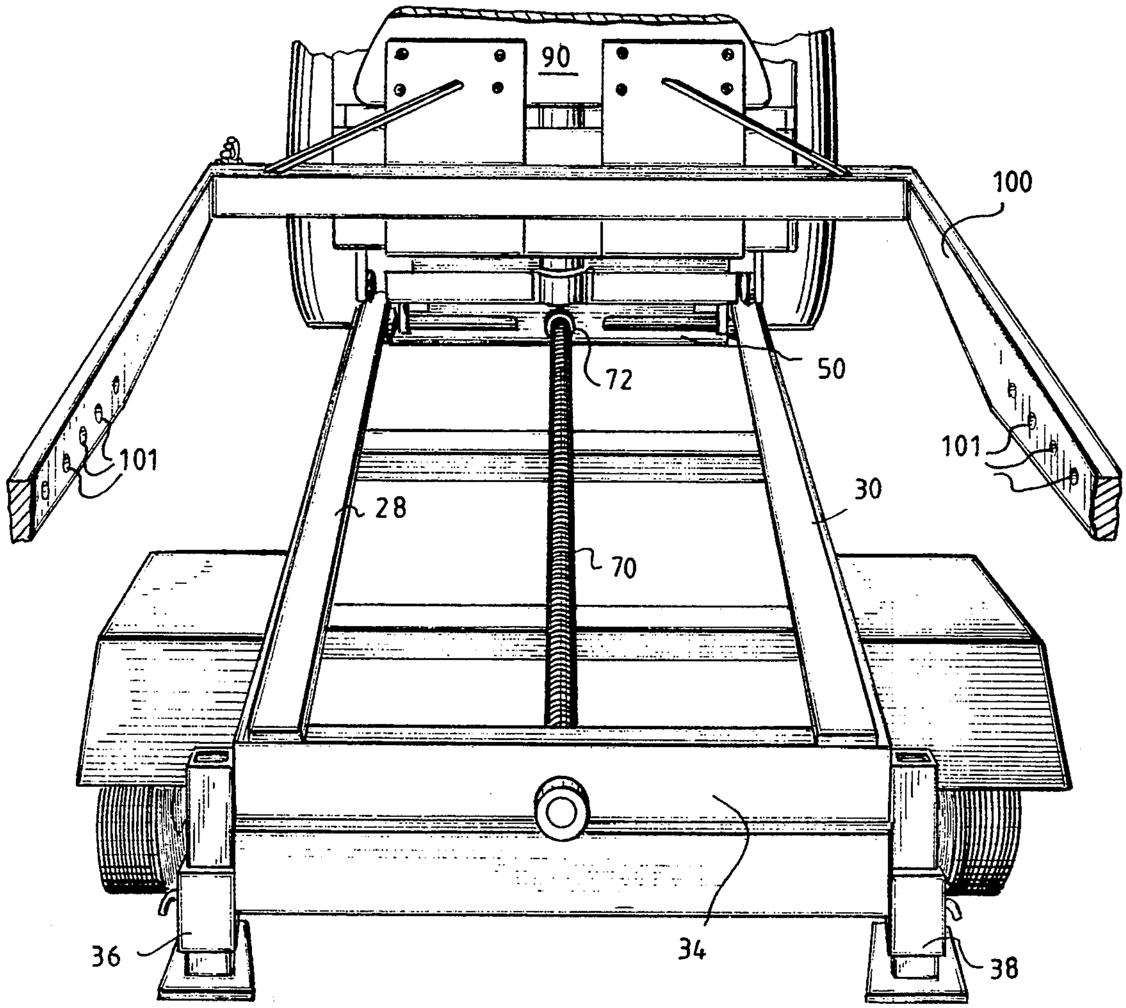
FIG. 2 is a broken perspective view from the rear of the truck carrying the invention.
Figure 5:
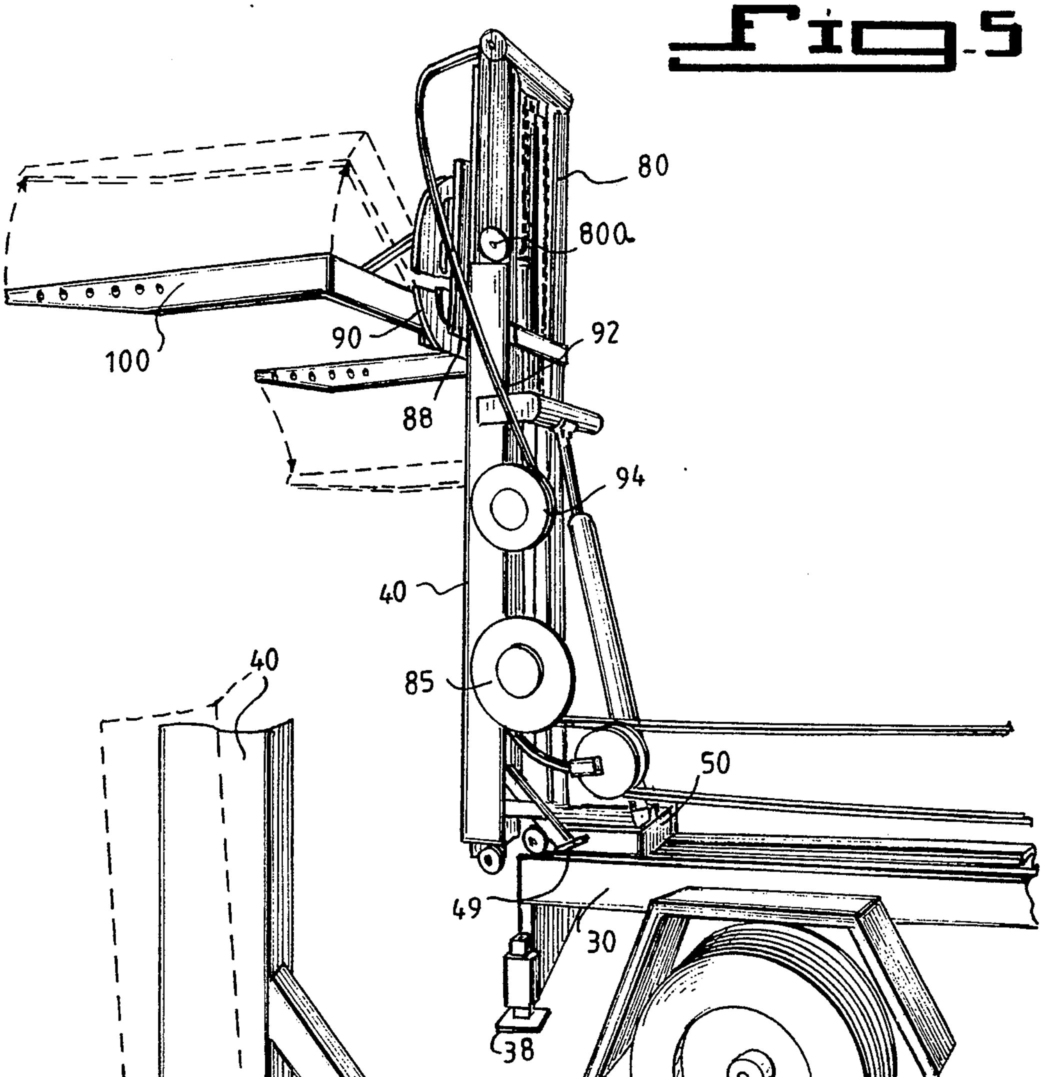
FIG. 5 is a broken perspective view of the mast in the rearmost position on the tracks and the fork in an intermediate and rotated position.
Figure 6:
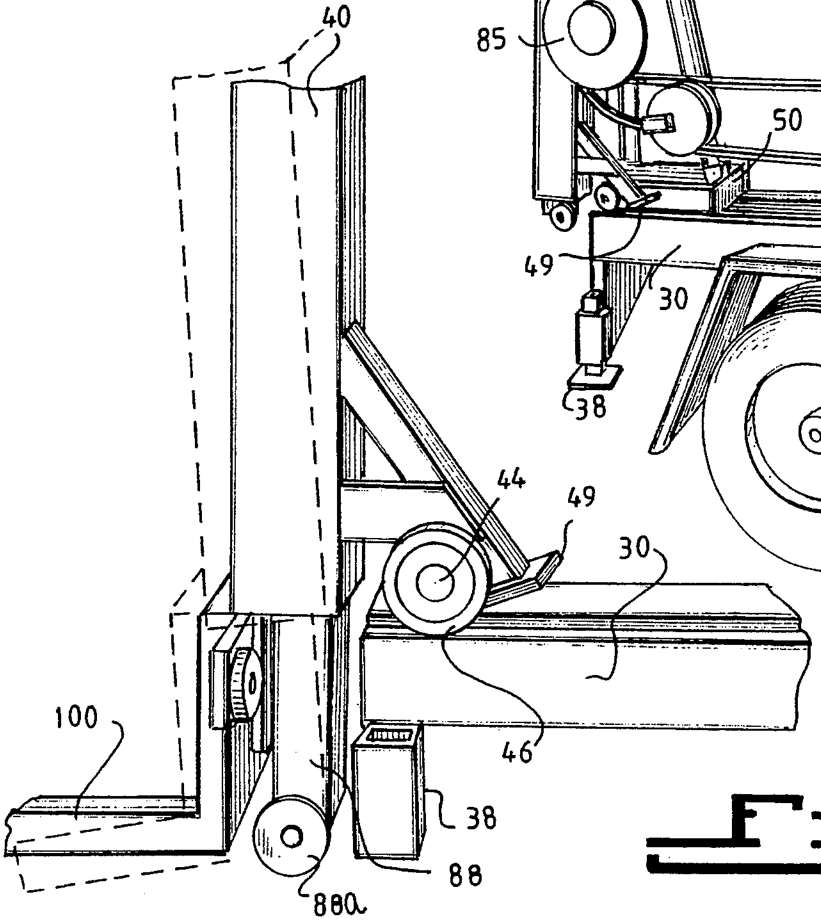
FIG. 6 is a broken perspective view of the mast in the rearmost position on the tracks and the fork in a lowered position and the mast tilted rearward.
Figure 8:
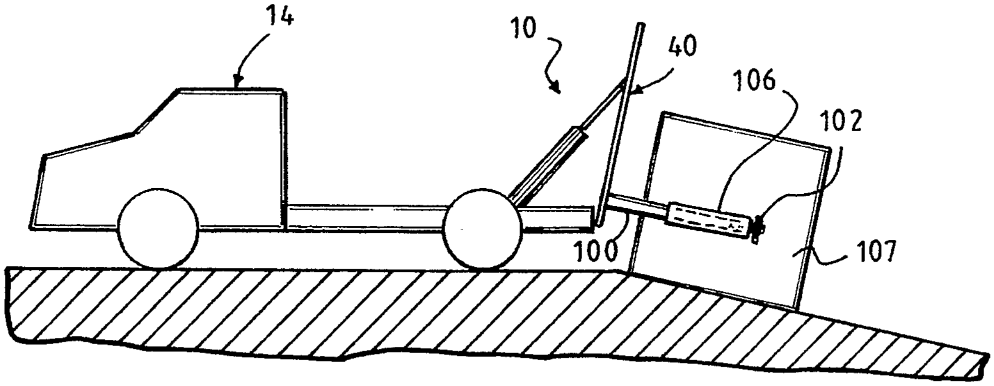
FIG. 8 is a schematic side view of the truck lifting mechanism being used to pick up a load on a downward incline.
Figure 8A:
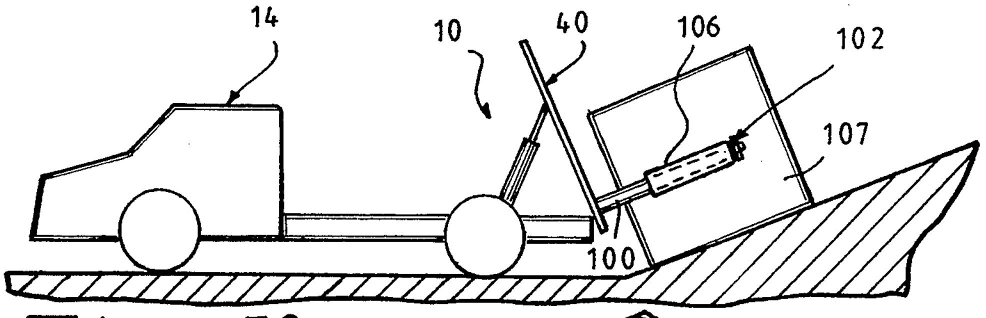
FIG. 8*a* is a schematic side view of the truck lifting mechanism being used to pick up a load on an upward incline.
Figure 7C:
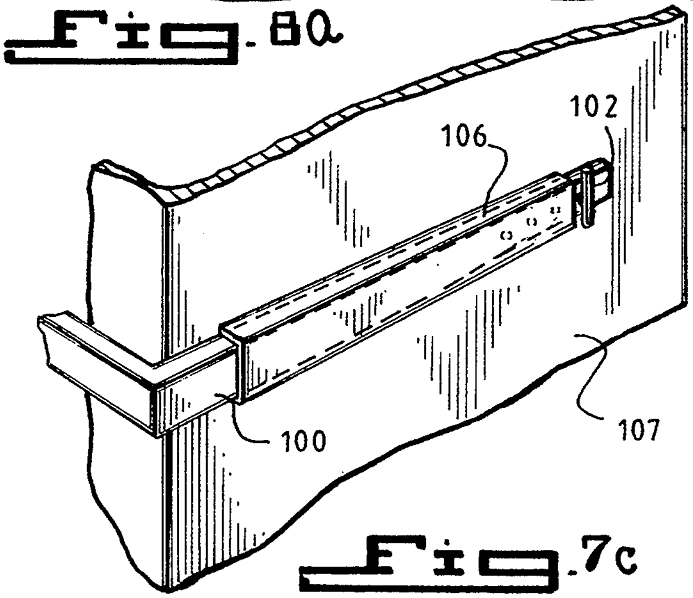
FIG. 7*c* is a broken perspective view of a fork tine and locking bolt in an engaged position.
Figure 7D:
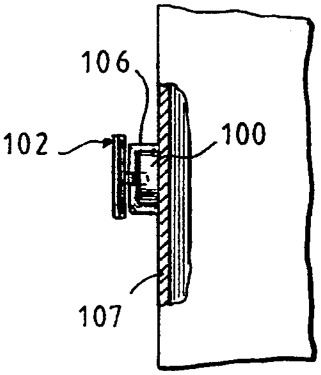
FIG. 7*d* is a rear side elevational view, in part section of the fork tine, container and locking bolt shown in FIG. 7*c*.

As mentioned above, the mast 40 is movable along the tracks 28, 30 from a front position next to the cab 13 as shown in FIG. 2 to a rear position shown best in FIGS. 5 and 6. It will be appreciated that in moving the mast along the tracks, the self-winding pulleys 63, 85, 94 take up slack in the flexible hydraulic conduits so that the conduits are not damaged. The lifting fork 100 can be raised or lowered as described above. When the mast is in the rear position shown in FIGS. 5 and 6, the lifting fork can be lowered a substantial distance below the tracks 28, 30 due to the vertical length of the fork support 88. This allows the lifting fork to reach down to a container in a well or on a slope as shown in FIG. 8. It also allows the fork to reach under a container to lift the container from its bottom rather than from sleeves or pockets on the side of the container. It will also be recalled that the mast is tiltable as described above. Because of the location of axle 44 and carriage 50, it is possible to tilt the mast quite a bit backward (away from the cab) even when the lifting fork is lowered below the tracks as shown in dotted lines in FIG. 6. Those skilled in the art will appreciate that this degree of articulation allows the lifting fork to reach almost any kind of container. Moreover, since the mast is also tiltable in a forward direction (toward the cab), after the fork engages a container, the mast can be tilted forward to allow it to engage a container on an upward incline as shown in FIG. 8*a*, thereby also preventing the container from sliding off the fork while it is being lifted. When the fork engages a container with sleeves, the rotational movement provided to the fork can be used to empty a trash container by rotating the fork more than 90° so that the contents of the container spill out of the top.

Figures 7, 7A, 7B:
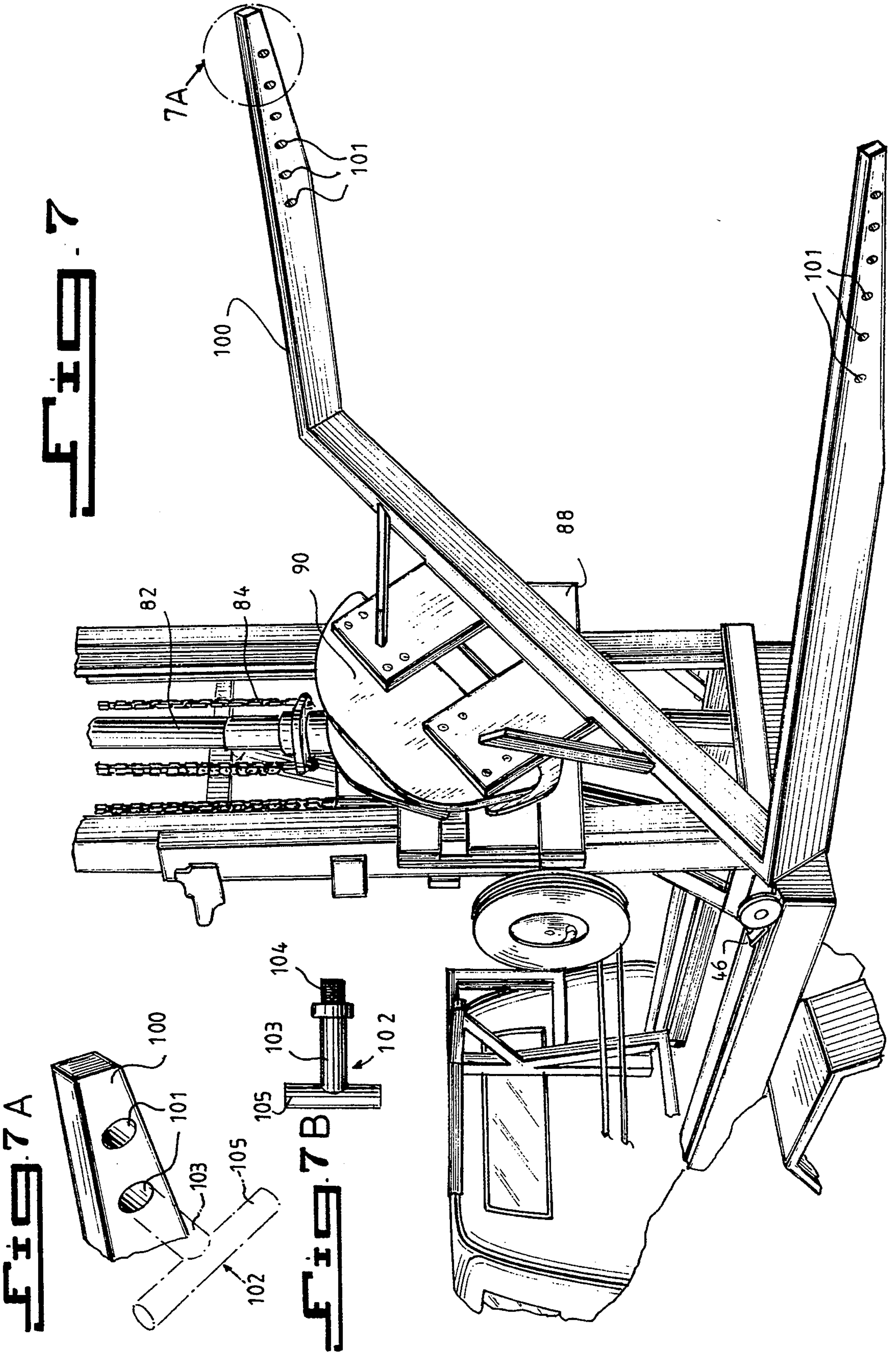
FIG. 7 is a broken perspective view of the mast, fork and fork rotator.
FIG. 7*a* is a broken perspective view of a fork tine with a container locking bolt.
FIG. 7*b* is a side view of a container locking bolt.

The lifting forks are given even greater adaptability to lift different kinds of containers by providing one or more T-shaped container locking bolts 102 such as those shown in FIGS. 7*a* and 7*b*. T-shaped locking bolts 102 each having a lower cylindrical leg 103 having threaded end 104 which is threadably receivable in one of a plurality of spaced apart threaded bores or holes 101 in the tines of fork 100, and an upper leg 105 which serves as a handle. As seen in FIGS. 7*c*, 7*d*, 8 and 8*a*, after the fork tines are inserted into the U-shaped pockets or sleeves 106 of the container 107, T-shaped locking bolt 102 is screwed into the first exposed hole of the fork tines or the ends thereof emerging from the rear end of the sleeves 106 of the container 107. This locks the container 107 onto the fork and prevents the container from slipping off as it is handled and moved by the lifting mechanism. As can be appreciated, each fork tine is provided with a plurality of holes to accommodate differently dimensioned sleeves 106.

The truck mounted lifting mechanism of the present invention is capable of lifting, rotating, and carrying loads of up to 8,000 lbs.

There has been described and illustrated herein the preferred embodiment of a truck mounted lifting mechanism for lifting and transporting containers. It is not intended, however, that the invention be limited to the preferred embodiment, as it is intended that the invention be as broad in scope as the art will allow and that the specification be read likewise. Thus, while particular hydraulic drive means have been disclosed, it will be appreciated that other types of drive means (e.g., electric motors) could be utilized without departing from the spirit of the invention. Also, while particular arrangements of hydraulic conduits have been shown, it will be recognized that other arrangements could be used with similar results obtained. Moreover, while particular configurations have been disclosed in reference to the mechanical stops and K-frame, it will be appreciated that other configurations could be used as well. Furthermore, while the tracks have been disclosed as having a C-shape, it will be understood that an inverted L-shape can achieve the same or similar function as disclosed herein. In addition, other locking mechanisms could possibly be used in place of the T-shaped locking bolts.

Finally, it should be appreciated that although the invention is specifically intended and especially useful for handling trash and refuse containers, it could be used for lifting and transporting a wide variety of loads, such as waste oil, cable bodies and grain, to name a few.

It will therefore be appreciated by those skilled in the art that yet other modifications could be made to the provided invention without deviating from its spirit and scope as so claimed.

What is claimed is:

1. A loading mechanism for loading and unloading a container onto a truck having a box frame, said mechanism comprising:

a horizontal track including two parallel horizontally spaced rails mounted on the frame and extending substantially the entire length of the frame, said rails each having an outer vertical portion and an upper horizontal portion, said upper horizontal portion having an upper and a lower surface;

a vertical mast having a base axle supporting a first pair of rollers located to one side of said vertical mast, said first pair of rollers engaging said upper surfaces of said rails;

a horizontal carriage coupled at one end to said base axle and having at another end a second pair of rollers, said second pair of rollers engaging said lower surfaces of said rails;

means for coupling said vertical mast to said horizontal carriage for tilting said vertical mast around said base axle so that said horizontal carriage remains in a horizontal position while said vertical mast tilts;

means for moving said carriage along said track;

lifting fork means for lifting a container, said lifting fork means coupled to the other side of said mast; and means for moving said lifting fork means up and down said vertical mast.

2. A loading mechanism according to claim 1, wherein said first pair of rollers have outer flanges which engage said outer vertical portions of said rails.

3. A loading mechanism according to claim 1, wherein said second pair of rollers have inner flanges which engage inner edges of said upper horizontal portions of said rails.

4. A loading mechanism according to claim 3, wherein said tilting means can tilt said mast in two opposite directions from vertical.

5. A loading mechanism according to claim 4, wherein said mast is provided with mechanical stop means to limit forward tilting to a predetermined angle.

6. A loading mechanism according to claim 1, wherein said means for moving said carriage along said track includes a screw gear mounted between said rails and extending substantially parallel to said rails, and said screw gear coupled to a drive motor and engaging a threaded member on said carriage.

7. A loading mechanism according to claim 6, wherein said threaded member comprises a ball nut.

8. A loading mechanism according to claim 1, wherein said means for moving said lifting fork includes means for lowering said lifting fork to ground level.

9. A loading mechanism according to claim 8, wherein said means for moving said lifting fork includes means for lowering said lifting fork below ground level.

10. A loading mechanism according to claim 1, further comprising adjustable stabilizing means mounted at a rear end of the truck frame for preventing truck wheels from acting as a fulcrum.

11. A loading mechanism according to claim 10, wherein said stabilizing means comprises a pair of telescoping jacks.

12. A loading mechanism according to claim 1, further comprising means for rotating said lifting fork about an axis substantially perpendicular to said mast.

13. A loading mechanism for loading and unloading a container onto a truck having a box frame, said mechanism comprising:

a horizontal track including two parallel horizontally spaced rails mounted on the frame and extending substantially the entire length of the frame;

a vertical mast having a base axle supporting a first pair of rollers located to one side of said vertical mast, said first pair of rollers engaging said rails;

a horizontal carriage coupled at one end to said base axle and having at another end a second pair of rollers, said second pair of rollers engaging said rails;

means for coupling said vertical mast to said horizontal carriage for tilting said vertical mast around said base axle so that said horizontal carriage remains in a horizontal position while said vertical mast tilts;

means for moving said carriage along said track;

lifting fork means for lifting a container, said lifting fork means coupled to the other side of said mast;

means for moving said lifting fork means up and down said vertical mast; and means for rotating said lifting fork means about an axis substantially perpendicular to said mast.

14. A loading mechanism for loading and unloading a container onto a truck having a box frame, said mechanism comprising:

a horizontal track including two parallel horizontally spaced rails mounted on the frame and extending substantially the entire length of the frame;

a vertical mast having a base axle supporting a first pair of rollers located to one side of said vertical mast, said first pair of rollers engaging said rails;

a horizontal carriage coupled at one end to said base axle and having at another end a second pair of rollers, said second pair of rollers engaging rails;

means for coupling said vertical mast to said horizontal carriage for tilting said vertical mast in two opposite directions around said base axle so that said horizontal carriage remains in a horizontal position while said vertical mast tilts;

means for moving said carriage along said track;

lifting fork means for lifting a container, said lifting fork means coupled to the other side of said mast; and means for moving said lifting fork means up and down said vertical mast.

15. A loading mechanism according to claim 14, wherein said means for moving said lifting fork includes means for lowering said lifting fork to ground level.

16. A loading mechanism according to claim 15, wherein said means for moving said lifting fork includes means for lowering said lifting fork below ground level.

17. A loading mechanism for loading and unloading a container onto a truck having a box frame, said mechanism comprising:

a horizontal track including two parallel horizontally spaced rails mounted on the frame and extending substantially the entire length of the frame;

a vertical mast having a base axle supporting a first pair of rollers located to one side of said vertical mast, said first pair of rollers engaging said rails;

a horizontal carriage coupled at one end to said base axle and having at another end a second pair of rollers, said second pair of rollers engaging said rails, said carriage including a centrally located threaded member;

means for coupling said vertical mast to said horizontal carriage for tilting said vertical mast around said base axle so that said horizontal carriage remains in a horizontal position while said vertical mast tilts;

a driving screw mounted between said rails and engaging said threaded member of said carriage;

means for rotating said driving screw to move said carriage along said track;

lifting fork means for lifting a container, said lifting fork means coupled to the other side of said mast; and means for moving said lifting fork means up and down said vertical mast.

18. A loading mechanism according to claim 17, wherein said threaded member is a ball nut.

* * * * *